United States Patent [19]

Gröblacher et al.

[11] Patent Number: 5,238,165
[45] Date of Patent: Aug. 24, 1993

[54] EXTRUDATE HAULER WITH UPPER AND LOWER ENDLESS TRACKS WITH YAW ADJUSTMENT

[75] Inventors: Hans Gröblacher; Ludwig Reisinger, both of McPherson, Kans.; Siegfried Topf, Kirchdorf, Austria

[73] Assignee: Friedrich Theysohn GmbH, Langenhagen, Fed. Rep. of Germany

[21] Appl. No.: 795,903

[22] Filed: Nov. 18, 1991

[30] Foreign Application Priority Data

Jun. 1, 1991 [DE] Fed. Rep. of Germany ....... 4117995

[51] Int. Cl.$^5$ ............................................. B65H 20/00
[52] U.S. Cl. ...................................... 226/172; 226/176
[58] Field of Search ............... 226/172, 173, 176, 177, 226/168, 170, 15, 16; 74/89.14, 425; 474/113, 133, 136

[56] References Cited

U.S. PATENT DOCUMENTS

| | | | |
|---|---|---|---|
| 3,045,728 | 7/1962 | Hutchinson et al. | 226/172 X |
| 3,065,893 | 11/1962 | Basford | 226/172 |
| 3,227,344 | 1/1966 | Rutter | 226/172 X |
| 3,251,523 | 5/1966 | Reifenhauser et al. | 226/172 |
| 3,469,819 | 9/1969 | Puretic | 226/172 X |
| 3,690,534 | 9/1972 | Biron | 226/173 X |
| 4,469,267 | 9/1984 | Franchuk et al. | 226/172 |
| 4,508,251 | 4/1985 | Harada et al. | 226/172 X |
| 4,563,147 | 1/1986 | Langecker | 425/376 |
| 4,619,310 | 10/1986 | Andoh et al. | 226/177 X |
| 4,828,226 | 5/1989 | Russell et al. | 226/172 X |
| 4,886,634 | 12/1989 | Strutzel et al. | 264/560 |

FOREIGN PATENT DOCUMENTS

| | | |
|---|---|---|
| 2354767 | 5/1975 | Fed. Rep. of Germany . |
| 1083065 | 1/1955 | France . |
| 0388614 | 6/1965 | Switzerland ............... 226/172 |
| 1419476 | 12/1975 | United Kingdom . |

Primary Examiner—Daniel P. Stodola
Assistant Examiner—Paul T. Bowen
Attorney, Agent, or Firm—Herbert Dubno

[57] ABSTRACT

A hauler for extruded profiles has a pair of track assemblies engaging at least one profile between them. At least one of the profiles is mounted so that it can yaw about a longitudinal axis through the center of that track assembly and a handwheel, electric motor or spring mechanism is provided to effect a yaw of at least 2° and up to 15°, preferably up to 4° about this longitudinal axis.

12 Claims, 3 Drawing Sheets

EXTRUDATE HAULER WITH UPPER AND LOWER ENDLESS TRACKS WITH YAW ADJUSTMENT

FIELD OF THE INVENTION

Our present invention relates to an apparatus for drawing at least one and usually two extruded profiles in an extrusion line for the production of such profiles from thermoplastic synthetic resins or other extrudable material.

BACKGROUND OF THE INVENTION

In the production of elongated structural shapes from extruded materials, usually extruded plastics, the extruder can be provided upstream of a calibrator and a saw, the calibrator serving to impart final dimensions and configurational nuances to the extruded body and the saw serving to cut the extruded body, arriving in a continuous form, into predetermined lengths. The extrusion apparatus or lines of this type can be provided with a haul-off, takeoff or hauler apparatus which is generally provided with upper and lower track assemblies between which the extrudate is gripped and which advances the extrudate along the line.

The extrudate is referred to variously as an extruded body, a profile or a workpiece and, in the production of window frame extrusions or the like, frequently two such extruded bodies must be gripped simultaneously between the upper and lower track assemblies.

The track assemblies comprise sprockets or rollers which are spaced apart by the lengths of the respective assembly on supports or frames, generally comprising two elongated members extending in the longitudinal direction, and an endless track or caterpillar passing around the sprockets or rollers, driven by a motor connected to a sprocket at one end of the assembly and carrying pads which engage the extruded article. Thus the pads of the upper and lower track assemblies grip the extruded profile between them and drag the extruded profile from the extruder which is located upstream of the hauler through any processing stations therebetween.

It has been found that certain types of extruded profiles cannot be uniformly gripped by conventional track assemblies which are usually oriented with respect to one another in a fixed relationship. For example, the pads of one or another of the track assemblies may not be oriented with respect to a particular shape so that the extruded profile can be effectively engaged, and as a result, the workpiece can be damaged. In addition, in the production of window profiles, when two such profiles are extruded simultaneously and both are to be uniformly gripped utilizing conventional hauler apparatus in which the orientations of the upper and lower track assembly can be fixed with respect to one another, it is frequently found that one of the profiles will be gripped with a greater force than the other and uniform products will not be obtained.

In general, therefore, it can be said that conventional hauler apparatus utilizing track assemblies with fixed orientations, at least with respect to longitudinal axes of these assemblies, may result in excessive defects in the product and reduced productivity of the overall apparatus.

The problem is especially pronounced when the extruded workpiece has a nonsymmetrical cross section and especially surfaces which are inclined or angled in a nonsymmetrical manner.

OBJECTS OF THE INVENTION

It is, therefore, the principal object of the present invention to provide an improved hauler apparatus which is free from the drawbacks enumerated above.

Another object of this invention is to provide an improved hauler for extruded profiles which is particularly effective for the haul-off of two such profiles simultaneously in an extrusion system for window profiles or the like which are simultaneously extruded.

Yet another object of the invention is to reduce the defects and increase the productivity of an extrusion apparatus by enabling a hauler to more effectively grip nonsymmetrical extruded profiles.

Still another object of our invention is to provide a hauler for extruded profiles which enables adjustment thereof for more effective displacement of one or more profiles along the extrusion processing path.

SUMMARY OF THE INVENTION

These objects and others which will become apparent hereinafter are attained, in accordance with this invention in a hauler which has upper and lower elongated track assemblies as described and wherein at least one and at least preferably the upper track assembly, can be rotated through at least a limited angle about its longitudinal axis i.e. wherein at least one track assembly and preferably the upper track assembly is provided with means for imparting a yaw to that assembly about a longitudinal axis thereof.

More particularly, the invention can comprise:
a machine support;
a lower elongated track assembly on the support having a lower endless track with pads engageable with the profile from below;
an upper elongated track assembly on the support having an upper endless track spacedly juxtaposed with the lower track and engageable with the profile from above, the upper endless track having pads and the profile being received between the tracks so as to be drawn from an inlet side of the assemblies to an outlet side thereof, the upper elongated track assembly having a longitudinal axis generally parallel to a path of the profile between the tracks;
means for driving the tracks to displace the profile between them; and
yaw-generating means operatively connected to the upper track assembly for rotating the upper assembly through angles of at least 2° in opposite senses about the axis to tilt the pads of the upper track with respect to the pads of the lower track about the axis, thereby imparting a yaw movement to the upper assembly about the longitudinal axis.

According to a feature of the invention, both track assemblies ca be provided with yaw-adjustment capabilities through at least 2° on opposite sides of a median orientation about a longitudinal axis which lies at the intersection of the vertical and horizontal median planes through the track assembly.

Preferably, however, this yaw adjustment can permit a displacement of the adjustable track assembly through at least 3° and up to substantially 4° to either side of the median position.

According to a feature of the invention, the upper bracket assembly comprises a pair of longitudinally-extending members of which sprockets are journaled at the opposite ends thereof and which have the upper endless track guided therearound. A ball-shaped or spherical pivot is provided for at least the upper track assembly and can lie generally in the longitudinal median plane of the upper track between these members along the longitudinal axis for enabling tilting of the upper assembly in opposite senses about this axis.

The way in which the upper assembly is mounted, moreover, can be applicable to the lower assembly as well if a yaw adjustment is to be provided for the lower assembly which is independent of the yaw adjustment of the upper assembly.

The yaw-generating means can enable a worm and wormwheel gearing operatively connected to the upper assembly for imparting the yaw movement thereto. A shaft can, according to a feature of the invention, pass through the ball pivot perpendicular to the longitudinal axis and the gearing can be pivotally connected to the shaft at one end thereof.

According to another feature of the invention, a hand wheel is connected to the worm for rotating same and the gearing includes a wormwheel meshing with the worm and driving a screw pivotally connected to the shaft at one end thereof.

Advantageously an arm is swingable on the shaft and opposite end thereof and a pivot assembly and arm spaced from the shaft is connected to one of the members supporting the sprockets for enabling swinging movement of the upper assembly toward and away from the lower assembly. The upper assembly can be provided with at least one fluid-operated cylinder for controlling a spacing between the upper assembly and the lower assembly. Thus the upper assembly can pivot in the aforementioned longitudinal median plane by the pivot assembly and about an axis perpendicular to the yaw axis in addition to being capable of adjustment in the yaw sense.

As an alternative to the hand wheel control, the present invention provides for adjustment of the yaw-adjustment assembly or each such assembly by an electric motor which can be controlled, if desired, by a remote control or from the machine panel. A spring mechanism can provide automatic control of the yaw. According to another feature of the invention, the assembly which is tiltable about its longitudinal axis can also be shiftable together with this longitudinal axis, transverse to its direction of movement.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
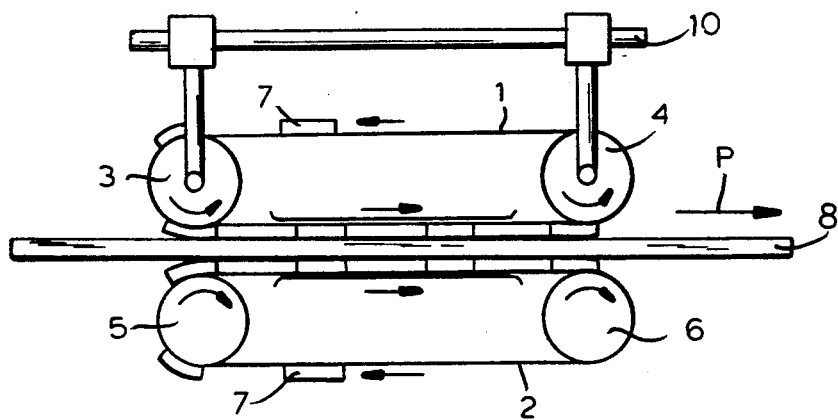
FIG. 1 is a schematic illustration of an apparatus according to the invention diagrammatically illustrating the principles thereof.

FIG. 1 shows in highly diagrammatic form tracks 1 and 2 forming a haul-off apparatus or hauler for use in an extrusion line to draw the extruded product from the extruder along the processing line which can include a calibrator. The tracks 1 and 2 are elongated, endless and guided over the wheels 3 and 4 or 5 and 6 which can be sprocket wheels. One each of the wheels 3, 4 and 5, 6 of each track 1 and 2 can be driven so that wheels 3-6 and the two tracks 1 and 2 are driven in the directions represented by the arrows in FIG. 1.

The tracks 1 and 2 can be formed as conveyor chains on which pads 7 of rubber or plastic are mounted, the pads 7 lying contiguously along their outer peripheries, nevertheless being separable from one another as the track travels around sprockets.

In FIG. 1, to simplify the illustration, only half or fewer of the pads 7 have been illustrated. The tracks 1 and 2 thus can be treated as if they were endless belts. It is possible, in some cases, to leave gaps between the pads 7 where they engage the workpiece.

Between the pads of the two tracks, a profile, extrudate or like workpiece 8, to be displaced by the hauler in the direction P, is received. The pads 7, where they engage the workpiece 8, bear firmly thereagainst.

In the best mode embodiment of the invention, the tracks 1 and 2 are provided one above the other, although it is possible to provide the tracks in a side by side arrangement. In the FIGS. 1 and 2, the two tracks 1 and 2 are disposed one above the other.

Figure 2:
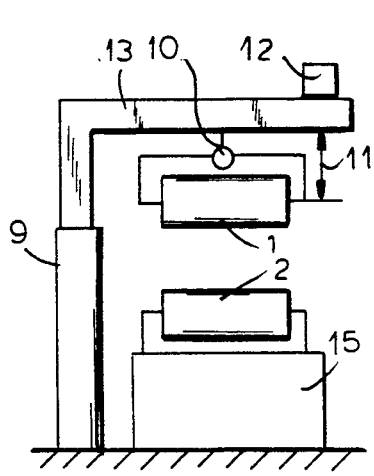
FIG. 2 is a highly diagrammatic cross sectional view through the apparatus.

As can be seen from FIG. 2, the track 1 is fastened upon a holder 9 which has the configuration of a gallows or bracket. It is also possible to provide on the two sides of the tracks 1 and 2, support frame members. To adjust the spacing between the tracks 1 and 2, the holder 9 can be adjustable in its height.

In the embodiment illustrated, moreover, the track 1 is suspended on a shaft 10 which is fastened on the holder 9 and is preferably located in the center of the track so that it extends preferably the entire length thereof as shown in FIG. 1 and lies at the intersection of vertical and horizontal median planes of the track 1.

The entire track assembly 1 is thus mounted on this shaft, including the sprockets 3 and 4 as well as the drive of the track and any other elements required for its operations.

The track 1 is mounted on the shaft 10 so that it can be tilted as represented by the double-headed arrow 11.

Figure 3:
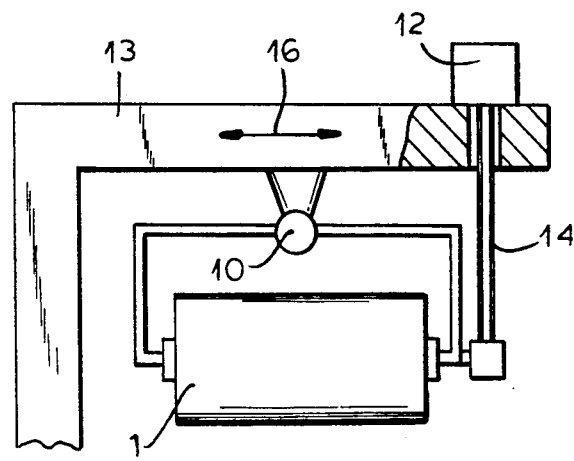
FIG. 3 is an enlarged view of one of the track assemblies.
Figure 4:
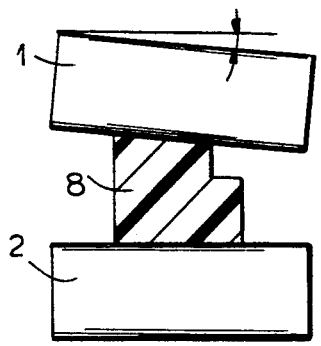
FIG. 4 is a highly simplified detail of the apparatus.
Figure 6:
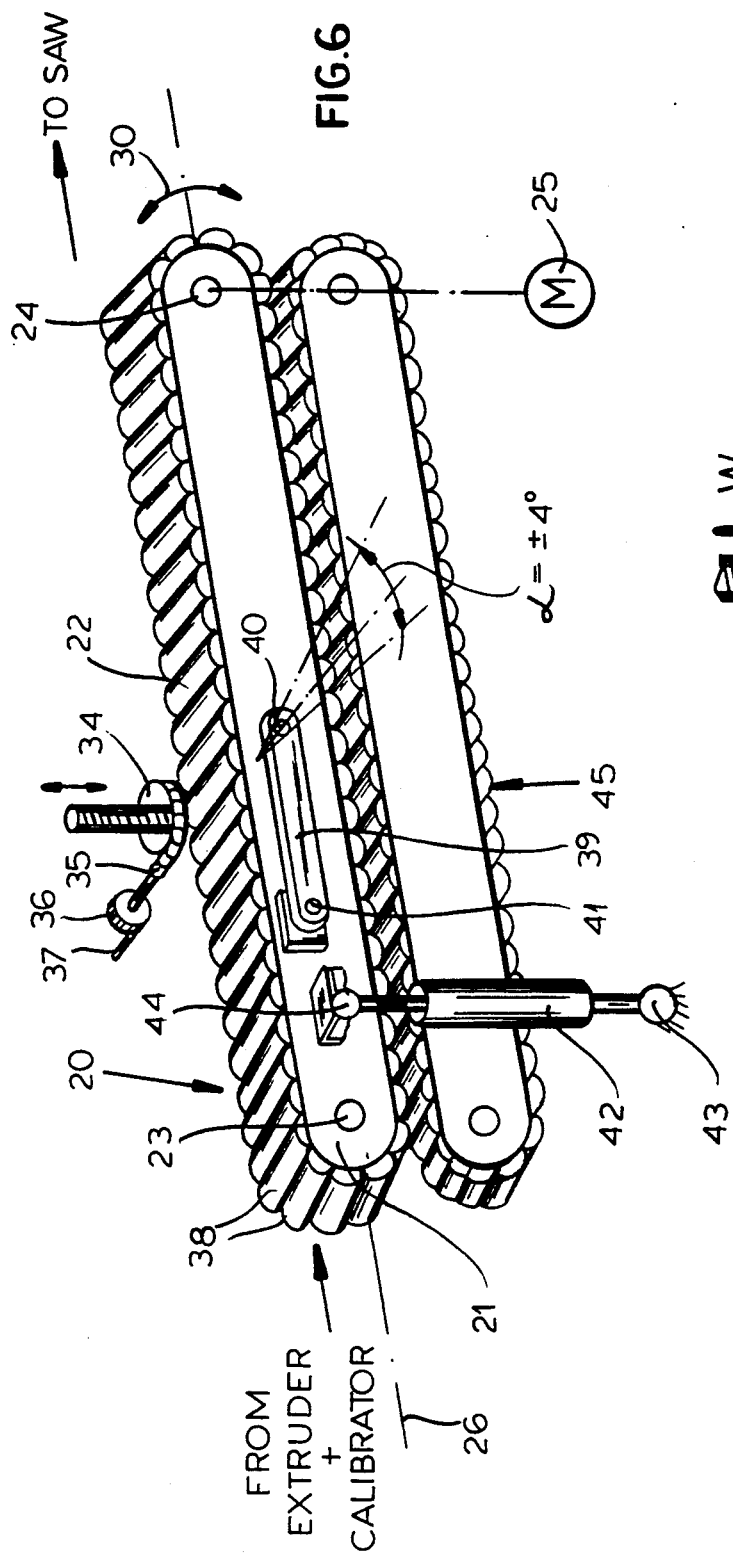
FIG. 6 is a diagrammatic perspective view illustrating another embodiment of haul-off apparatus according to the invention.

The means for this tilting of the track 1 about its longitudinal axis can include a handwheel arrangement as shown in FIG. 6, although it is possible to use an electric motor 12 which can be fastened on the transverse beam 13 of the bracket 9 and can adjust the angular position of the track 1 via a spindle 14 as shown, for example, in FIG. 3 about the longitudinal axis.

Figure 5:
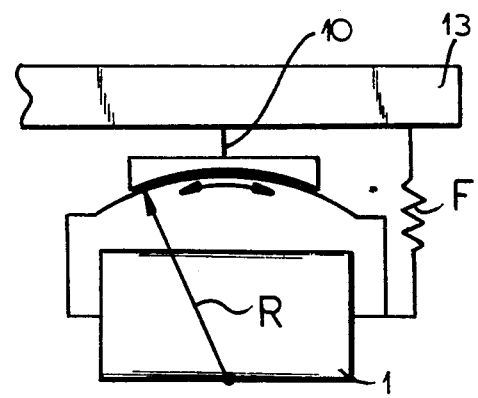
FIG. 5 is a view similar to FIG. 3 showing another embodiment.

The angular adjustment of the track 1 about its longitudinal axis can also be effected via a spring mechanism 5 which can be a mechanical spring or a pneumatic spring as represented at F in FIG. 5, interposed between the transverse beam 13 and the mounting of the track 1 in place of the spindle 14. The spring mechanism F is so adjusted that the track assumes its normal position as seen in FIG. 2, i.e. the median position.

Upon an increased loading of the track 1 because of a nonsymmetrical configuration of the workpiece 8, e.g. because it has an inclined surface engageable by the track 1, or because an inclined orientation is required to allow the track 1 to engage two extrusions simultaneously, the track 1 will tilt automatically about its longitudinal axis, i.e. will yaw against a restoring spring force tending to bring the track back into its normal or median position.

For profiles or workpieces 8 which are of symmetrical cross section, for example, round or square, having parallel surfaces engaged by the tracks, the tracks will assume the position indicated in FIG. 2. When, however, the profile 8 has inclined surfaces engageable by the track (see FIG. 2), the track 1 will tilt about the longitudinal axis of the shaft 10.

In this case, the track 1 will rest in its tilted orientation with its pads against the inclined upper surface of the profile 8. The nontilted lower track 2 rests with its supporting surface against the lower surface of the profile 8. It is possible, therefore, to haul-off a profile 8 without detrimentally increasing the pressing force thereon and without any change in shape or excessive wear of the tracks 1 and 2.

The angle by which the track 1 can be tilted about the axis 10 at a maximum is limited. At an excessive angle, the force component applied to the profile 8 in the transverse direction will become excessive. The maximum angle should be 15° to either side of the median position, the minimum angle of permissible tilt should be 2° and preferred tilt angles are to 4° to either side of the median position.

In the embodiments illustrated, only the upper track 1 has been shown to be tiltable about the longitudinal axis, although it will be understood that the track 2 can be similarly tiltable about its longitudinal axis by the use of a hand wheel or a motor.

For complex cross sections of the profile 8 which may not have planar surfaces engageable upon a tilting of one track only, it is advantageous to have both tracks tiltable and to allow both tracks to shift laterally, i.e. in a direction perpendicular to the longitudinal axes to adjust to a complicated cross section profile.

By providing the shaft 10 so that it is central of the track 1, symmetric adjustment to either side of the neutral position is possible.

A shifting of the track 1 altogether with a tilting about the axis 10 can be achieved with a ball mounting of the track as indicated in FIG. 5 with the curvature of the ball mounting having a radius R such that the tilting of the track 1 is symmetrically compensated.

As can be seen in FIG. 6, an upper track 20 has a pair of longitudinal members, one of which is shown at 21, while the longitudinal member on the opposite side is not visible, upon which the track 22 is mounted via sprockets and sprocket shafts 23 and 24. The sprocket shaft 24 may be driven by a motor 25 and speed-reduction gearing which can be mounted upon the member 21.

In this embodiment, the tilting about the longitudinal axis 26 is effected by mounting the members 21 on a shaft 27 which has a ball 28 as a bearing member received in a housing of the machine represented at 29. Thus, when the shaft is swung through the angle α shown in FIG. 6, the entire track assembly 20 is tilted through an angle of ±4° about the axis 26 as represented by the arrow 30.

The tilting action is effected by a ball joint 31 connected by a pivot 32 to a screw 33 which is nonrotatable but can be raised and lowered by an internally-threaded wormwheel 34 when the latter is driven by a worm 35 connected to the handwheel 36 with its handle 37. The screw 33 thereby forms a jack swinging the shaft 27 about the axis 26 and applying the yaw movement to the entire upper assembly 20. The pads of the track 22 are represented at 38.

Figure 7:
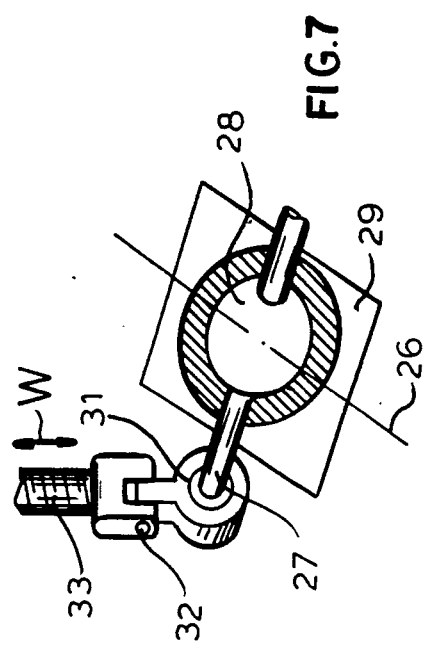
FIG. 7 is a diagrammatic detail showing the connection of the worm and wormwheel unit to FIG. 6 with the pivot shaft enabling the tilting of the upper track assembly to FIG. 6 about its longitudinal axis.

In addition, the swing arm 39 can be pivotally connected by a ball joint or swivel 40 to the other end of the shaft 27 and can have a pivot assembly 41 connecting it to one of the supports 20 which can be raised and lowered by a cylinder 42 connected by ball joints 43 and 44 to the housing of the apparatus and to the upper track assembly, respectively. The system of FIGS. 6 and 7 operates basically in the manner previously described with the cylinder 42 controlling the opening between the upper track assembly 20 and the lower track assembly 45 and the handwheel and worm and worm gearing 33-36 controlling the yaw of the upper track. The lower track assembly can be similarly tiltable.

Figure 8:
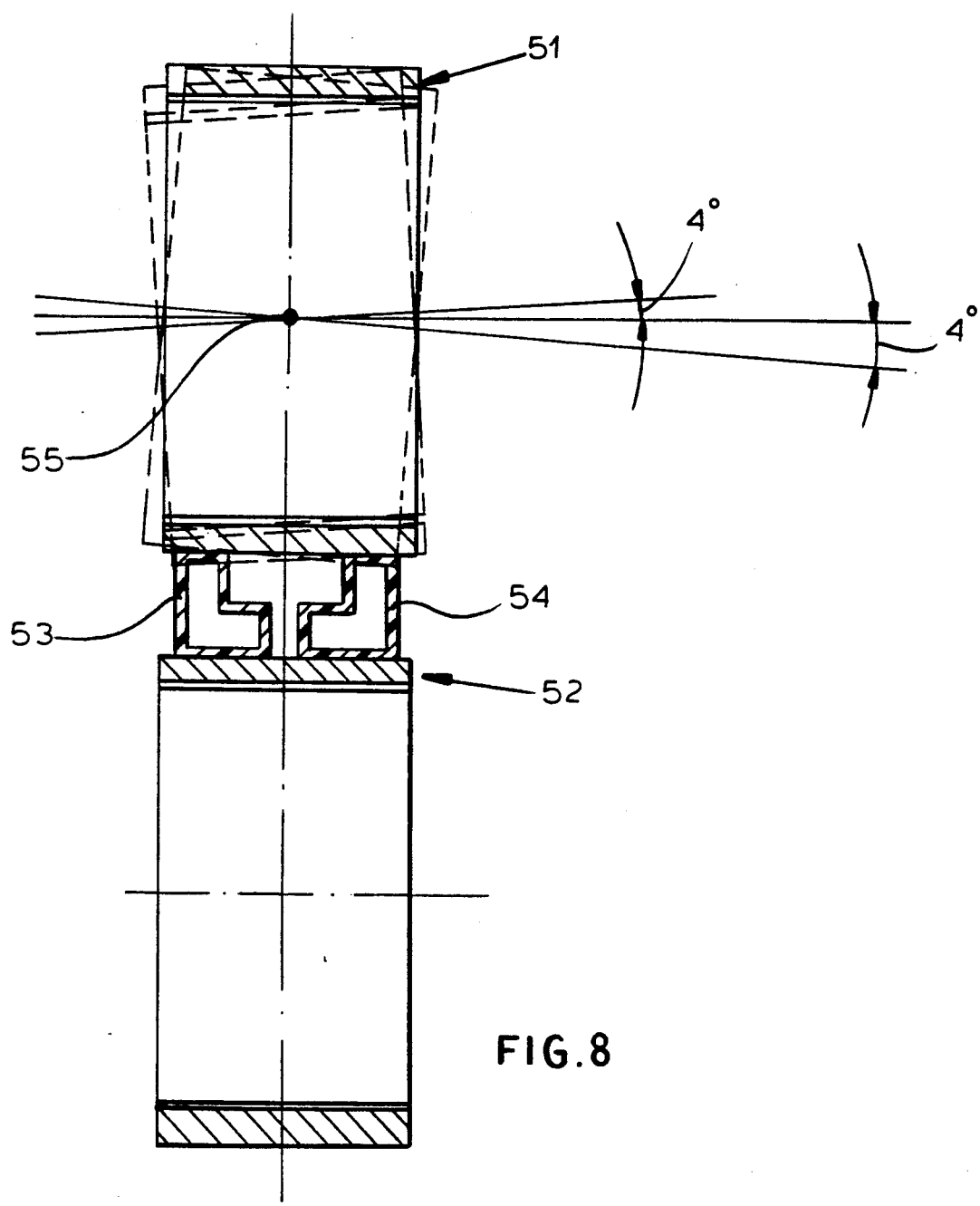
FIG. 8 is a diagrammatic cross sectional view through two track assemblies showing the engagement of two window profiles by these assemblies.

In FIG. 8, we have shown a system in which upper and lower track assemblies 51 and 52 engage two window profiles 53 and 54 between them and illustrating how the tilt of the upper track assembly enables matching of the orientation of the upper track assembly about the longitudinal axis 55 to differences in the extruded profiles.

We claim:

1. A haul-off apparatus for use downstream of an extruder for drawing at least one extruded profile therefrom, said haul-off apparatus comprising:

a machine support;

a lower elongated track assembly on said support having a lower endless track with pads engageable with said profile from below;

an upper elongated track assembly on said support comprising:

a pair of longitudinally extending members, sprockets journaled on said members at opposite ends thereof, an upper endless track spacedly juxtaposed with said lower track and engageable with said profile from above, said upper endless track being guided around said sprockets and having pads and a longitudinal axis generally parallel to a path of said profile between said tracks, said profile being received between said tracks so as to be drawn from an inlet side of said assemblies to an outlet side thereof, and a ball pivot lying generally in a longitudinal median plane of said upper track between said members and along said longitudinal axis for enabling tilting of said upper assembly in said opposite senses about said longitudinal axis;

means for driving said tracks to displace said profile between them; and yaw-generating means operatively connected to said upper track assembly for rotating said upper assembly through angles of at least 2° in opposite senses about said longitudinal axis to tilt the pads of said upper track with respect to the pads of said lower track about said axis, thereby imparting a yaw movement to said upper assembly about said longitudinal axis, said yaw-generating means including a worm and wormwheel gearing operatively connected to said upper assembly for imparting said yaw movement to said upper assembly.

2. The apparatus defined in claim 1, further comprising a shaft extending through said ball pivot perpendicular to said longitudinal axis, said gearing being pivotally connected to said shaft at one end thereof.

3. The apparatus defined in claim 2, further comprising a handwheel connected to said worm for rotating same and said gearing including a wormwheel meshing with said worm and driving a screw pivotally connected to said shaft at said one end thereof.

4. The apparatus defined in claim 2, further comprising an arm swingable on said shaft at an opposite end thereof, and a pivot assembly on said arm spaced from said shaft and connected to one of said members for enabling swinging movement of said upper assembly toward and away from said lower assembly, said upper assembly being provided with at least one fluid-operated cylinder for controlling a spacing of said upper assembly from said lower assembly.

5. The apparatus defined in claim 2, wherein said yaw-generating means is constructed and arranged to impart yaw of at least ±3° to said upper assembly about said longitudinal axis.

6. The apparatus defined in claim 1, further comprising a shaft extending through said members perpendicular to said longitudinal axis, an arm swingable on said shaft, and a pivot assembly on said arm spaced from said shaft and connected to one of said members for enabling swinging movement of said upper assembly toward and away from said lower assembly, said upper assembly being provided with at least one fluid-operated cylinder for controlling a spacing of said upper assembly from said lower assembly.

7. The apparatus defined in claim 1, wherein said yaw-generating means includes a hand wheel connected to said gearing for rotating same.

8. The apparatus defined in claim 1, wherein said longitudinal axis is disposed along the center of said upper endless track.

9. The apparatus defined in claim 1, wherein said yaw-generating means includes an electric motor for driving said gearing.

10. The apparatus defined in claim 1, further comprising means for shifting said upper track in a direction transverse to said axis.

11. A haul-off apparatus for use downstream of an extruder for drawing at least one extruded profile therefrom, said haul-off apparatus comprising;
   a machine support;
   a lower elongated track assembly on said support having a lower endless track with pads engageable with said profile from below;
   an upper elongated track assembly on said support comprising:
      a pair of longitudinally extending members,
      sprockets journaled on said members at opposite ends thereof,
      an upper endless track spacedly juxtaposed with said lower track and engageable with said profile from above, said upper track being guided around said sprockets and having pads and a longitudinal axis generally parallel to a path of said profile between said tracks, said profile being received between said tracks so as to be drawn from an inlet side of said assemblies to an outlet side thereof,
      a ball pivot lying generally in a longitudinal median plane of said upper track between said members and along said longitudinal axis for enabling tilting of said upper assembly in said opposite senses about said longitudinal axis, and
   a shaft extending through said ball pivot perpendicular to said longitudinal axis,
   means for driving said tracks to displace said profile between them;
   yaw-generating means operatively connected to said upper track assembly for rotating said upper assembly through angles of at least 2° in opposite senses about said longitudinal axis to tilt the pads of said upper track with respect to the pads of said lower track about said axis, thereby imparting a yaw movement to said upper assembly about said longitudinal axis, said yaw-generating means being pivotally connected to said shaft at one end thereof.

12. The apparatus defined in claim 11, further comprising an arm swingable on said shaft at an opposite end thereof, and a pivot assembly on said arm spaced from said shaft and connected to one of said members for enabling swinging movement of said upper assembly toward and away from said lower assembly, said upper assembly being provided with at least one fluid-operated cylinder for controlling a spacing of said upper assembly from said lower assembly.

* * * * *